(12) United States Patent
Lee et al.

(10) Patent No.: US 7,773,570 B2
(45) Date of Patent: Aug. 10, 2010

(54) METHOD AND SYSTEM FOR TRANSMITTING/RECEIVING SIGNAL IN WIRELESS LOCAL NETWORK MESH COMMUNICATION SYSTEM

(75) Inventors: Sung-Won Lee, Seoul (KR); Rakesh Taori, Suwon-si (KR); Young-Gon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 901 days.

(21) Appl. No.: 11/603,020

(22) Filed: Nov. 22, 2006

(65) Prior Publication Data

US 2007/0127428 A1    Jun. 7, 2007

Related U.S. Application Data

(60) Provisional application No. 60/738,600, filed on Nov. 22, 2005.

(30) Foreign Application Priority Data

Aug. 22, 2006    (KR)    ............ 10-2006-0079436

(51) Int. Cl.
*H04W 4/00*    (2009.01)
(52) U.S. Cl. .............. 370/338; 370/310.2; 370/466; 370/328
(58) Field of Classification Search ........... 370/338, 370/328, 310.2, 331
See application file for complete search history.

(56) References Cited

U.S. PATENT DOCUMENTS

| | | | |
|---|---|---|---|
| 6,665,536 B1 * | 12/2003 | Mahany | 455/432.1 |
| 7,136,361 B2 * | 11/2006 | Benveniste | 370/310.2 |
| 7,280,555 B2 * | 10/2007 | Stanforth et al. | 370/445 |
| 7,283,495 B2 * | 10/2007 | Lee et al. | 370/331 |
| 7,382,756 B2 * | 6/2008 | Barber et al. | 370/338 |
| 7,406,296 B2 * | 7/2008 | Haartsen | 455/41.2 |
| 7,423,963 B2 * | 9/2008 | Lee | 370/229 |
| 7,519,038 B2 * | 4/2009 | Zhao et al. | 370/338 |
| 7,545,786 B2 * | 6/2009 | Krahn et al. | 370/338 |
| 7,570,610 B2 * | 8/2009 | Chen | 370/318 |
| 7,586,876 B2 * | 9/2009 | Chung et al. | 370/331 |
| 7,684,430 B2 * | 3/2010 | Gaur et al. | 370/447 |
| 2002/0172186 A1 * | 11/2002 | Larsson | 370/349 |
| 2002/0181425 A1 * | 12/2002 | Sherman | 370/338 |
| 2003/0035464 A1 | 2/2003 | Dehner et al. | |
| 2004/0090943 A1 * | 5/2004 | da Costa et al. | 370/338 |
| 2004/0120292 A1 * | 6/2004 | Trainin | 370/338 |
| 2005/0047371 A1 | 3/2005 | Bennett | |
| 2005/0058151 A1 * | 3/2005 | Yeh | 370/445 |
| 2005/0135284 A1 * | 6/2005 | Nanda et al. | 370/294 |

(Continued)

FOREIGN PATENT DOCUMENTS

KR    10-2005-0098790    10/2005

*Primary Examiner*—Sharad Rampuria
(74) *Attorney, Agent, or Firm*—NSIP Law

(57) ABSTRACT

Disclosed is a method for transmitting/receiving signals in a Wireless Local Area Network (WLAN) mesh communication system. The method includes transmitting, by a transmitter, a control message including an address to receivers according to a generated traffic, if traffic is generated; and receiving, by a receiver, the transmitted control message, confirming the address included in the control message, and performing a predetermined operation according to results obtained by confirming the address.

32 Claims, 4 Drawing Sheets

U.S. PATENT DOCUMENTS

| | | | |
|---|---|---|---|
| 2005/0135318 A1* | 6/2005 | Walton et al. | 370/338 |
| 2006/0002355 A1* | 1/2006 | Baek et al. | 370/338 |
| 2006/0039333 A1* | 2/2006 | Pirzada et al. | 370/338 |
| 2006/0165036 A1* | 7/2006 | Chandra et al. | 370/329 |
| 2006/0221920 A1* | 10/2006 | Gopalakrishnan et al. | 370/338 |
| 2007/0019591 A1* | 1/2007 | Chou et al. | 370/337 |
| 2007/0097933 A1* | 5/2007 | Kuc | 370/338 |
| 2007/0230418 A1* | 10/2007 | Takeuchi et al. | 370/338 |
| 2009/0103501 A1* | 4/2009 | Farrag et al. | 370/337 |

* cited by examiner

| frame control (401) | duration (403) | MAC (405) | FCS (407) |

FIG.4

Octet:  0         1         2         3         4         5
     0011 0101  0111 1011  0001 0010  0000 0000  0000 0000  0000 0001

FIG.5

METHOD AND SYSTEM FOR TRANSMITTING/RECEIVING SIGNAL IN WIRELESS LOCAL NETWORK MESH COMMUNICATION SYSTEM

PRIORITY

This application claims to the benefit under 35 U.S.C. §119(e) of an application filed in the United States Patent and Trademark Office on Nov. 22, 2005 and assigned U.S. provisional application Ser. No. 60/738,600 and under 35 U.S.C. §119(a) of an application filed in the Korean Intellectual Property Office on Aug. 22, 2006 and assigned Ser. No. 2006-79436, the contents of both of which are hereby incorporated by reference.

BACKGROUND OF THE INVENTION

1. Field of the Invention

The present invention relates to a Wireless Local Area Network (WLAN) Mesh communication system. More particularly, the present invention relates to a method and a system for transmitting/receiving signals in a WLAN mesh communication system.

2. Description of the Related Art

In the next generation communication system, research for providing users with high speed services varying in Quality of Service (QoS) has been actively conducted. Specifically, research into a WLAN communication system has been actively conducted through Institute of Electrical and Electronic Engineers (EEE) 802.11 standards. Among the IEEE 802.11 standards, an IEEE 802.11s standard, in which a cable connection between Access Points (APs) is not required, has been actively conducted. A WLAN communication system defined in the EEE 802.11s standard is referred to as a WLAN mesh communication system. The WLAN mesh communication system is mainly useful in an area in which it is difficult to install a general WLAN communication system as defined in an IEEE 802.11 standard.

Such a WLAN mesh communication system includes a Mesh AP Portal (MAPP) connected to a wired network by wire, a plurality of MAPs, and Stations (STAs) for receiving a communication service from the MAPP and the MAPs. The MAPP functions as both a Mesh Point (MP) and an AP, and each of the MAPs functions as both the MP and the AP. The MAPP performs not only the same functions as those of the MAPs, but also functions as a gateway of the WLAN mesh communication system by connecting a wireless network to the wired network by wire. The MAPP and the MAPs form mesh links. The formed mesh links or the MAPP and the MAPs all include MPs in order to perform the function of the MP. It is assumed that the MAPP and the MAPs function as the MP as described above. Further, the MAPP and the MAPs functioning as the AP include a predetermined number of STAs, respectively, so that local networks are formed.

The WLAN mesh communication system designates links between the MAPs and the STAs of each MAP through addresses. Hereinafter, traffic between the MAPP/the MAPs and the STAs will be referred to as Basic Service Set (BSS) traffic, and traffic between the wired network/the MAPP and the MAPs will be referred to as Wireless Distribution System (WDS) traffic. The WDS traffic has a priority higher than that of the BSS traffic. Accordingly, if WDS traffic is generated, the MAPs transmit a control message, such as a Clear-to-Send (CTS), and other MAPs and STAs having received the control message switch their operation modes into waiting modes, respectively. That is, the above described IEEE 802.11 standard is problematic in that it does not prepare a detailed provision about a receiver, which receives the transmitted control message, information about a corresponding receiver, which is to switch an operation mode into a waiting mode after receiving the control message, and a method for inserting the information about the receiver into the control message.

In other words, since the mesh links are formed between the MAPP and the MAPs, and the local networks are formed between the MAPP/the MAPs and the STAs as described above, the control message is transmitted to the formed mesh links and local networks. If the MAPs receive the control message transmitted to the mesh links, they switch their operation modes into the waiting modes. The MAPs forming the mesh links must process the generated WDS traffic, but they cannot process the WDS traffic because the operation modes have been switched into the waiting modes. Therefore, in order to solve the above described problem, it is necessary to provide a method by which MAPs configure a control message and transmit/receive the configured control message in the WLAN mesh communication system.

SUMMARY OF THE INVENTION

Accordingly, embodiments of the present invention solve at least the above-mentioned problems occurring in the prior art and provide other advantages which will become apparent from the following description. It is an object of exemplary embodiments of the present invention to provide a method and a system for transmitting/receiving signals in a mesh network.

It is another object of embodiments of the present invention to provide a method and a system for transmitting/receiving signals in a mesh WLAN communication system.

It is further another object of embodiments of the present invention to provide a method and a system for transmitting/receiving a control message in a mesh WLAN communication system.

In accordance with one aspect of the present invention, there is provided a method for transmitting/receiving signals in a Wireless Local Area Network (WLAN) mesh communication system. The method includes transmitting, by a transmitter, a control message including an address to receivers according to a generated traffic, if traffic is generated; and receiving, by a receiver, the transmitted control message, confirming the address included in the control message, and performing a predetermined operation according to results obtained by confirming the address.

In accordance with another aspect of the present invention, there is provided a method for transmitting/receiving a control message of one or more receivers in a Wireless Local Area Network (WLAN) mesh communication system including the receivers. The method includes setting, by a transmitter, a Media Access Control (MAC) address of a receiver, which has a priority from among the receivers, in an MAC address field of a frame of the control message; setting time maintaining the priority in a duration field of the frame; transmitting the frame to a receiver, the frame employing the MAC address as a destination; receiving by the receiver, the transmitted frame, confirming a priority corresponding to the MAC address; and performing a predetermined operation according to the confirmed priority.

In accordance with further another aspect of the present invention, there is provided a system for transmitting/receiving signals in a Wireless Local Area Network (WLAN) mesh communication system. The system includes a transmitter for transmitting a control message including an address to receivers according to a generated traffic, if traffic is generated; and a receiver for receiving the transmitted control message, confirming the address included in the control message, and performing a predetermined operation according to results obtained by confirming the address.

In accordance with still another aspect of the present invention, there is provided a system for transmitting/receiving a control message of one or more receivers in a Wireless Local Area Network (WLAN) mesh communication system including the receivers, the system including a transmitter for setting a Media Access Control (MAC) address of a receiver, which has a priority from among the receivers, in an MAC address field of a frame of the control message, setting time maintaining the priority in a duration field of the frame, and transmitting the frame to a receiver, the frame employing the MAC address as a destination; and a receiver for receiving the frame, confirming a priority corresponding to the MAC address, and performing a predetermined operation according to the confirmed priority.

BRIEF DESCRIPTION OF THE DRAWINGS

The above and other objects, features and advantages of exemplary embodiments of the present invention will be more apparent from the following detailed description taken in conjunction with the accompanying drawings, in which:

FIG. 4 is a diagram schematically illustrating the frame structure of a control message in a WLAN mesh communication system according to an exemplary embodiment of the present invention; and FIG. 5 is a diagram schematically illustrating the structure of a MAC address according to an exemplary embodiment of the present invention.

Throughout the drawings, like reference numbers will be understood to refer to like elements, features and structures.

DETAILED DESCRIPTION OF EXEMPLARY EMBODIMENTS

Figure 1:
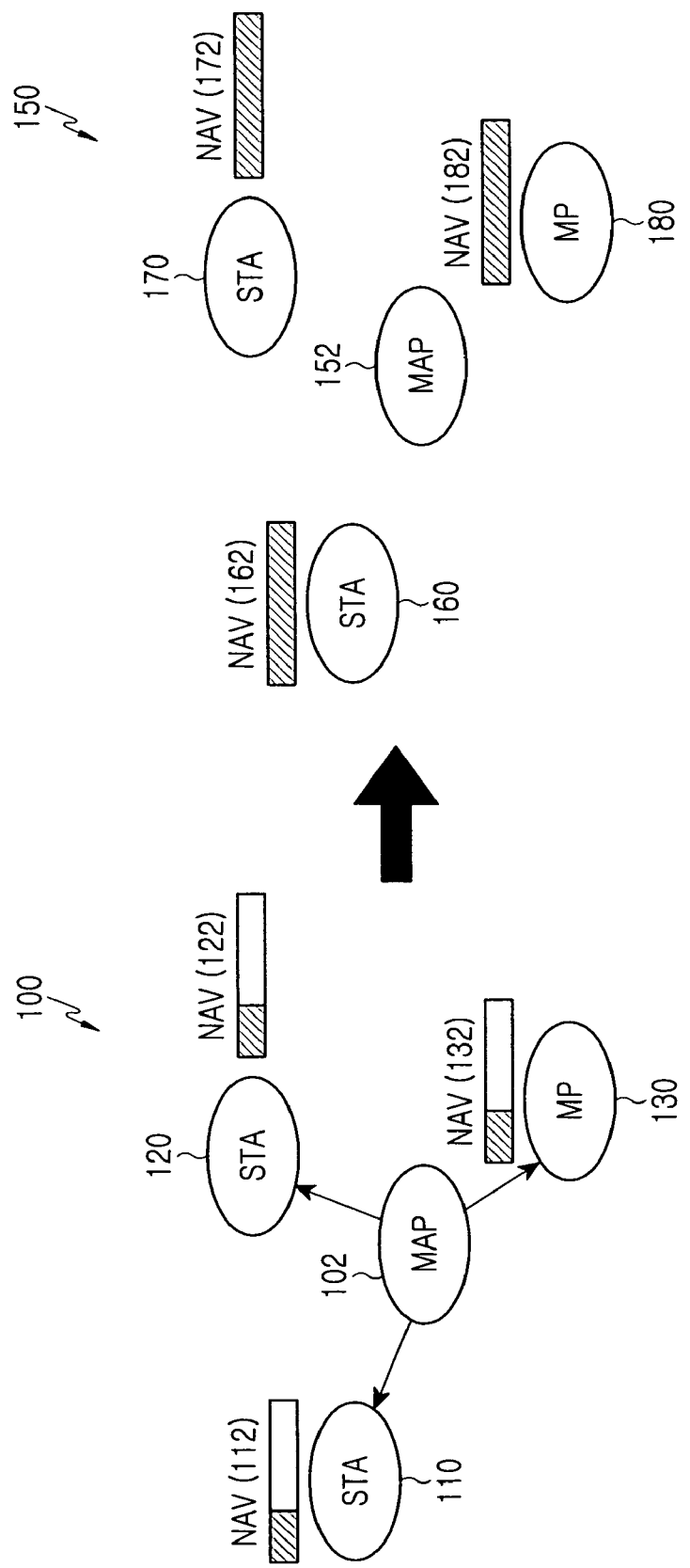
FIG. 1 is a diagram illustrating the construction of a system for transmitting/receiving a control message in a WLAN mesh communication system.

Exemplary embodiments of the present invention will be described in detail herein below with reference to the accompanying drawings. It should be noted that the embodiments described herein are intended to be exemplary and to illustrate the inventions, and that various changes and modifications to the embodiments described herein may be made without departing from the scope and spirit of the invention. Furthermore, detailed descriptions of known functions and configurations are omitted for clarity and conciseness.

Exemplary embodiments of the present invention provide a method and a system for transmitting/receiving signals in a communication system, such as a mesh Wireless Local Area Network (WLAN) communication system. In the following detailed description, the WLAN mesh communication system will be described as one example of an Institute of Electrical and Electronic Engineers (IEEE) 802.11 communication system. However, the method and system for transmitting/receiving signals in the WLAN mesh communication system described herein can also be applied to other communication systems as well as other WLAN mesh communication systems.

Further, exemplary embodiments of the present invention provide a method and system for configuring and transmitting/receiving a control message, such as a Clear-to-Send (CTS) message, in a WLAN mesh communication system. The following detailed description illustrates a method and system by which a plurality of Mesh Access Points (MAPs) configure and transmit/receive a control message in a WLAN mesh communication system, wherein the MAPs function as both a Mesh Point (MP) and an AP and provide a communication service to users, such as, Stations (STAs).

That is, if traffic with a priority is generated, a system according to an exemplary embodiment of the present invention transmits a control message including information for allowing operation modes of remaining receivers, except for a receiver that will preferentially process the generated traffic, to be switched into waiting modes. Then, the receivers having received the control message confirm the information included in the control message, switch their operation modes into waiting modes or process the generated traffic with a priority.- In other words, exemplary embodiments of the present invention provide a method and system for configuring a control message for controlling a plurality of receivers including receivers with priorities of a predetermined operation, and transmitting/receiving the configured control message.

A WLAN mesh communication system according to an exemplary embodiment of the present invention includes a Mesh AP Portal (MAPP) connected to a wired network by wire and functioning as both an MP and an AP, a plurality of MAPs, and STAs for receiving a communication service from the MAPP and the MAPs. The MAPP performs not only the same functions as those of the MAPs, but also functions as a gateway of the WLAN mesh communication system by connecting a wireless network to the wired network by wire. The MAPP and the MAPs form mesh links. The formed mesh links or the MAPP and the MAPs all include MPs in order to perform the function of the MP. It is assumed that the MAPP and the MAPs function as the MP as described above. Further, the MAPP and the MAPs functioning as the AP include a predetermined number of STAs, respectively, so that local networks are formed.

The WLAN mesh communication system designates links between the MAPs and the STAs of each MAP through addresses. Hereinafter, traffic between the MAPP/the MAPs and the STAs will be referred to as a Basic Service Set (BSS) traffic, and traffic between the wired network/the MAPP and the MAPs will be referred to as a Wireless Distribution System (WDS) traffic. The WDS traffic has a priority higher than that of the BSS traffic. Accordingly, if the WDS traffic is generated, the MAPs transmit a control message, such as, a CTS message, and other MAPs and STAs having received the control message switch their operation modes into waiting modes, and perform a Network Allocation Vector (NAV) update operation, respectively. That is, exemplary embodiments of the present invention provide a method and system for configuring a control message for controlling operations of receivers, which have priorities of operations, corresponding to traffic, and transmitting/receiving the configured control message in a WLAN mesh communication system, thereby improving the performance of the WLAN mesh communication system.

Since the NAV update operation after the MAPs and STAs switch their operation modes into waiting modes has no direct connection to the embodiments of the present invention described herein, details will be omitted for clarity and conciseness. Hereinafter, an operation for transmitting/receiving a control message in the WLAN mesh communication system will be described with reference to FIG. 1.

FIG. 1 is a diagram illustrating the construction of a system for transmitting/receiving a control message in the WLAN mesh communication system. FIG. 1 illustrates both a system 100 in which a MAP transmits a control message, and a system 150 in which a STA and an MP receive the control message and perform predetermined operations.

Referring to FIG. 1, the system 100 includes both mesh links, which are formed by a MAP 102 and an MP 130, and a local network formed by the MAP 102 and STAs 110 and 120. Herein, the STAs 110 and 120 and the MP 130 do not perform an update operation for NAVs 112, 122 and 132 because operation modes of the STAs 110 and 120 and the MP 130 are in active states. If WDS traffic is generated in the system 100, the MAP 102 transmits a control message to both the MP 130, which forms the mesh links with the MAP 102, and the STAs 110 and 120 forming the local network with the MAP 102 because the WDS traffic has a priority higher than that of BSS traffic, that is, the WDS traffic preferentially has a Transmission Opportunity (TXOP) as compared to the BSS traffic.

Then, STAs 160 and 170 and an MP 180 in the system 150, which has received the control message, switch their operation modes into waiting modes and perform an update operation for NAVs 162, 172 and 182, respectively. That is, if an MAP 152 in the system 150 transmits a control message to both the MP 180, which forms mesh links with the MAP 152, and the STAs 160 and 170 forming a local network with the MAP 152, the STAs 160 and 170 and the MP 180 receive the control message, switch their operation modes into waiting modes and perform the update operation for NAVs 162, 172 and 182, respectively. Hereinafter, an operation for transmitting/receiving a control message in the WLAN mesh communication system according to an exemplary embodiment of the present invention will be described with reference to FIGS. 2 and 3.

Figure 2:
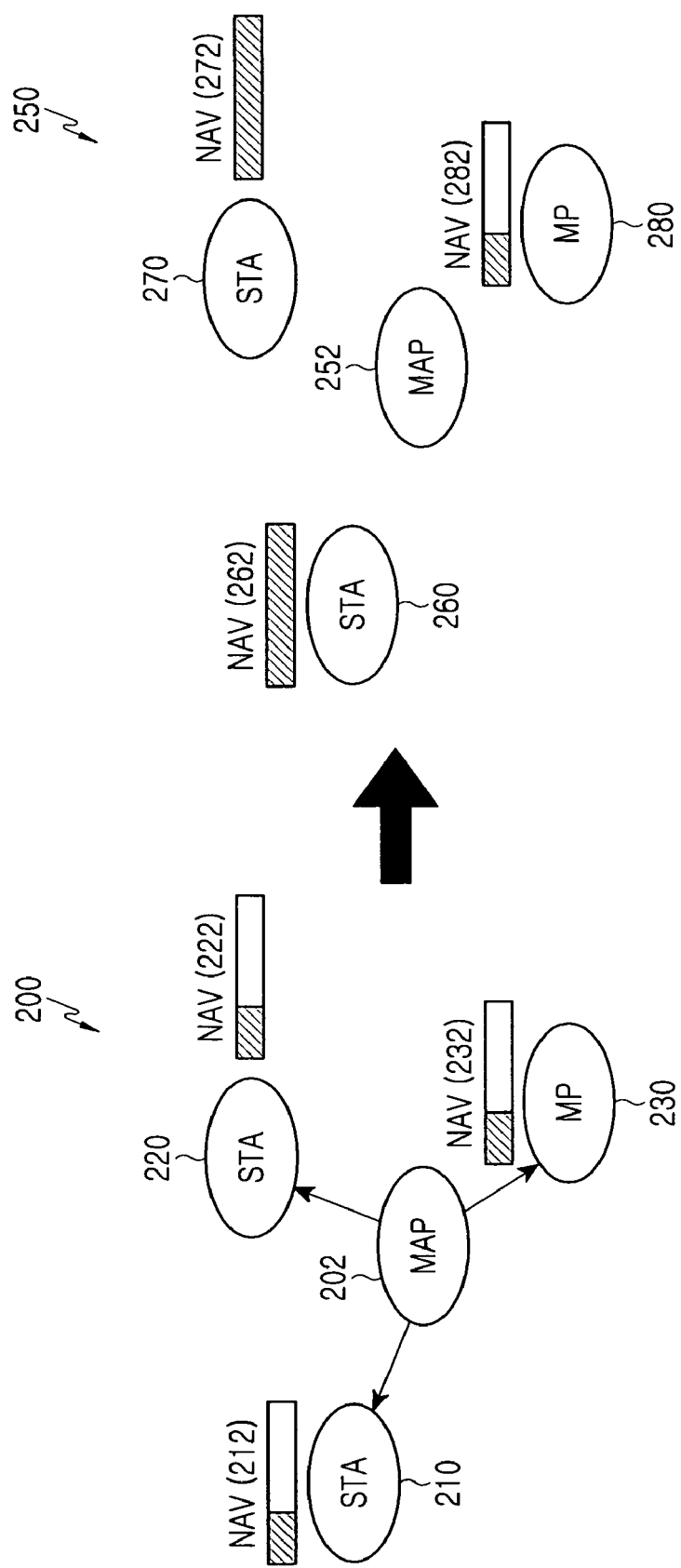
FIG. 2 is a diagram illustrating the construction of a system for transmitting/receiving a control message in a WLAN mesh communication system according to an exemplary embodiment of the present invention.

FIG. 2 is a diagram illustrating the construction of a system for transmitting/receiving a control message in the WLAN mesh communication system according to an exemplary embodiment of the present invention. FIG. 2 illustrates both a system 200 in which a MAP transmits a control message, and a system 250 in which a STA and an MP receive the control message and perform predetermined operations.

Referring to FIG. 2, the system 200 includes both mesh links, which are formed by a MAP 202 and an MP 230, and a local network formed by the MAP 202 and STAs 210 and 220. Herein, the STAs 210 and 220 and the MP 230 do not perform an update operation for NAVs 212, 222 and 232 because operation modes of the STAs 210 and 220 and the MP 230 are in active states. If WDS traffic is generated in the system 200, the MAP 202 transmits a control message to both the MP 230, which forms the mesh links with the MAP 202, and the STAs 210 and 220 forming the local network with the MAP 202 because the WDS traffic has a priority higher than that of BSS traffic, that is, the WDS traffic preferentially has a TXOP as compared to the BSS traffic. Herein, the MAP 202 transmits the control message including an address of a receiver intended for reception of the control message, that is, the address of the receiver, which will receive the control message, switch an operation mode into a waiting mode, and perform the update operation for the NAVs 212, 222 and 232, in other words, a receiver Media Access Control (MAC) address. The MAC address becomes a receiver address, that is, address bits corresponding to the STAs 210 and 220 forming the local network, or an address bit corresponding to the MP 230 forming the mesh links.

Then, each of the STAs 260 and 270 and the MP 280 in the system 250, which has received the control message, confirms the MAC address included in the control message, that is, the address bit of the MAC address, and switches its own operation mode into a waiting mode if the confirmed MAC address is equal to its own address. In other words, the STAs 260 and 270 switch their operation modes into waiting modes and perform an update operation for the NAVs 262 and 272, respectively, because the address bits of the MAC address included in the control message are the address bits corresponding to the STAs 260 and 270. However, the MP 280 does not switch its own operation mode into a waiting mode and thus does not perform an update operation for the NAV 282 because the address bit of the MAC address included in the control message is not the address bit corresponding to the MP 280.

When the address bit of the MAC address included in the control message is the address bit corresponding to the MP 280, the STAs 260 and 270 having confirmed the control message switch their operation modes into waiting modes and perform the update operation for the NAVs 262 and 272, respectively, because the address bits of the MAC address included in the control message are not the address bits corresponding to the STAs 260 and 270. Further, the MP 280 having confirmed the control message does not switch its own operation mode into a waiting mode and thus does not perform the update operation for the NAV 282 because the address bit of the MAC address included in the control message is the address bit corresponding to the MIP 280.

If the WDS traffic is generated as described above, the MAP 202 of the system 200 transmits a control message including information for allowing the operation modes of the STAs 210 and 220, forming the local network with the MAP 202, to be switched into waiting modes in order to preferentially process the WDS traffic. Further, the MAP 202 transmits a control message including information for preventing the operation mode of the MP 230, forming the mesh links with the MAP 202, from being switched into the waiting mode. Consequently, the system 250 preferentially processes the generated WDS traffic rather than BSS traffic. That is, the STAs 260 and 270 having received the control message switch their operation modes into waiting modes, and then perform the update operation for the NAVs 262 and 272, respectively. Further, the MP 280 does not perform the update operation for the NAV 282 because its own operation mode is in an active state, and processes the generated WDS traffic.

Figure 3:
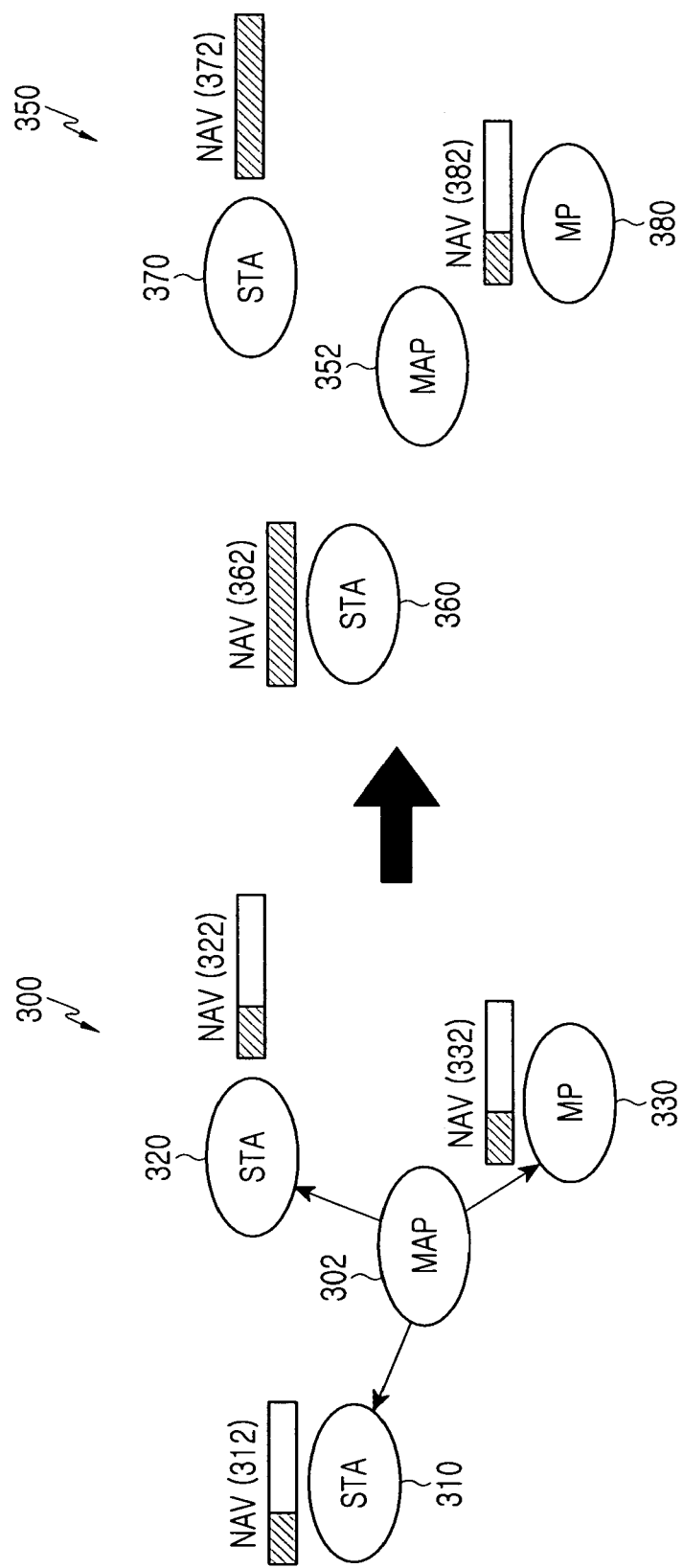
FIG. 3 is a diagram schematically illustrating the construction of a system for transmitting/receiving a control message in a WLAN mesh communication system according to an exemplary embodiment of the present invention.

FIG. 3 is a diagram illustrating the construction of a system for transmitting/receiving a control message in the WLAN mesh communication system according to an exemplary embodiment of the present invention. FIG. 3 illustrates both a system 300 in which a MAP transmits a control message, and a system 350 in which a STA and an MP receive the control message and perform predetermined operations. In FIG. 2, the MAC address included in the control message is an individual address. However, in FIG. 3, the MAC address included in the control message is a group address.

Referring to FIG. 3, the system 300 includes both mesh links, which are formed by a MAP 302 and an MP 330, and a local network formed by the MAP 302 and STAs 310 and 320. Herein, the MP 330 denotes MPs grouped corresponding to a plurality of mesh links. The STAs 310 and 320 and the MP 330 do not perform an update operation for NAVs 312, 322 and 332 because operation modes of the STAs 310 and 320 and the MP 330 are in active states. If WDS traffic is generated in the system 300, the MAP 302 transmits a control message to both the MP 330, which forms the mesh links with the MAP 302, and the STAs 310 and 320 forming the local network with the MAP 302 because the WDS traffic has a priority higher than that of BSS traffic, that is, the WDS traffic preferentially has a TXOP as compared to the BSS traffic. Herein, the MAP 302 transmits the control message including a destination address at which the control message is to be received, that is, the address of the receiver, which will receive the control message, switch an operation mode into a waiting mode, and perform the update operation for the NAVs 312, 322 and 332, in other words, a receiver MAC address. The MAC address becomes an address bit of a random number as a receiver address, such as a group address corresponding to STAs forming a local network, or an address bit of a random number as a group address corresponding to MPs grouped after forming mesh links.

Then, each of the STAs 360 and 370 and the MP 380 in the system 350, which has received the control message, confirms the MAC address included in the control message, that is, the address bit of the MAC address, and switches its own operation mode into a waiting mode if the confirmed MAC address is equal to an address of a group corresponding to each of them. In other words, the STAs 360 and 370 switch their operation modes into waiting modes and perform an update operation for the NAVs 362 and 372, respectively, because the address bits of the MAC address included in the control message are the address bits of a group corresponding to the STAs 360 and 370. However, the MP 380 does not switch its own operation mode into a waiting mode and thus does not perform an update operation for the NAV 382 because the address bit of the MAC address included in the control message is not the address bit of a group corresponding to the MP 380.

When the address bit of the MAC address included in the control message is the address bit of the group corresponding to the MP 380, the STAs 360 and 370 having confirmed the control message switch their operation modes into waiting modes and perform the update operation for the NAVs 362 and 372, respectively, because the address bits of the MAC address included in the control message are not the address bits of the group corresponding to the STAs 360 and 370. Further, the MP 380 having confirmed the control message does not switch its own operation mode into a waiting mode and thus does not perform the update operation for the NAV 382 because the address bit of the MAC address included in the control message is the address bit of the group corresponding to the MP 380.

If the WDS traffic is generated as described above, the MAP 302 of the system 300 transmits a control message including information for allowing the operation modes of the STAs 310 and 320, forming the local network with the MAP 302, to be switched into waiting modes in order to preferentially process the WDS traffic. Further, the MAP 302 transmits a control message including information for preventing the operation mode of the MU 330, forming the mesh links with the MAP 302, from being switched into the waiting mode. Consequently, the system 350 preferentially processes the generated WDS traffic rather than BSS traffic. That is, the STAs 360 and 370 having received the control message switch their operation modes into waiting modes, and then perform the update operation for the NAVs 362 and 372, respectively. Further, the MP 380 does not perform the update operation for the NAV 382 because its own operation mode is in an active state, and processes the generated WDS traffic.

FIG. 4 is a diagram schematically illustrating the frame structure of a control message in the WLAN mesh communication system according to an exemplary embodiment of the present invention. FIG. 4 illustrates the frame structure when the control message is the CTS message as described above.

Referring to FIG. 4, the control message includes a frame control field 401, a duration field 403, an MAC field 405, and a Frame Check Sequence (FCS) field 407. The frame control field 401 includes frame control information, and the duration field 403 includes information about a duration in which the NAV update operation is to be performed as described above after the control message is received. The MAC field 405 includes the afore-described MAC address, and the FCS field 407 includes error detection information. Since the frame control field 401, the duration field 403 and the FCS field 407 have no direct connection to the present invention, details will be omitted here.

The MAC field 405 includes the receiver address, that is, the address bits corresponding to the STAs forming the local network or the MPs forming the mesh links, or the address bits of the group corresponding to the STAs or the MPs. That is, the MAC field 405 includes an individual address or a group address of an STA or an MP as an MAC address. Further, the MAC field 405 includes a globally administered address or a locally administered address of an STA or an MP as an MAC address. Furthermore, the MAC field 405 may also include an individual address and a globally administered address or a locally administered address as an MAC address, or may also include a group address and a globally administered address or a locally administered address as an MAC address.

Each of the receivers (such as STAs or MPs) having received the control message including such an MAC field 405 confirms the MAC address included in the MAC field 405, and operates in an active mode or a waiting mode if the address bit of the MAC address is an address bit corresponding to each of the receivers. Herein, when the confirmed MAC address is an individual address and a globally administered address or a locally administered address, or a group address and a globally administered address or a locally administered address, each of the receivers confirms the two address bits and operates in an active mode or a waiting mode as described above. Hereinafter, the structure of the MAC address according to the embodiment of the present invention will be described in detail with reference to FIG. 5.

FIG. 5 is a diagram illustrating the structure of the MAC address according to an exemplary embodiment of the present invention.

Referring to FIG. 5, the MAC address includes six octets 0 to 5, and each octet consists of eight bits. A first part including the first three octets 0 to 2 of the six octets represents a globally administered address, and a second part including the remaining three octets 3 to 5 represents a locally administered address. In the MAC address, the Most Significant Bit (MSB) of the first octet is a bit representing an individual address or a group address. If the MSB has a value of 0, the MAC address may represent an individual address. However, if the MSB has a value of 1, the MAC address may represent a group address. Herein, the group address may also include identification information of one or more receivers (such as STAs or MPs) connected to the system as described above. Further, in the MAC address, a bit subsequent to the MSB is a bit representing a globally administered address or a locally administered address. If this bit has a value of 0, the MAC address may represent a globally administered address. However, if this bit has a value of 1, the MAC address may represent a locally administered address. Accordingly, if these two bits of the MAC address have a value of 00, the MAC address represents a globally administered individual address. If these two bits of the MAC address have a value of 01, the MAC address represents a locally administered individual address. If these two bits of the MAC address have a value of 10, the MAC address represents a globally administered group address. If these two bits of the MAC address have a value of 11, the MAC address represents a locally administered group address.

A receiver having received the MAC address of 48 bits as described above operates in an active mode or a waiting mode if the address bit of the received MAC address is an address bit corresponding to the receiver. Herein, when the confirmed MAC address is an individual address and a globally administered address or a locally administered address, or a group address and a globally administered address or a locally administered address, the receiver confirms the two address bits and operates in an active mode or a waiting mode as described above.

According to exemplary embodiments of present invention as described above, if traffic to be preferentially processed is generated in a WLAN communication system, a control message including the address of a receiver which will process the traffic is transmitted, and thus other receivers having received the control message selectively switch operation modes, respectively. Consequently, it is possible to normally process the generated traffic.

Although exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for transmitting/receiving signals in a Wireless Local Area Network (WLAN) mesh communication system, the method comprising:
    transmitting, by a transmitter, a control message including an address to receivers according to a generated traffic, if traffic is generated; and
    receiving, by a receiver, the control message, confirming the address included in the control message, and performing a predetermined operation according to results obtained by confirming the address.

2. The method as claimed in claim 1, wherein the address included in the control message includes a Media Access Control (MAC) address of receivers that will process the generated traffic.

3. The method as claimed in claim 1, wherein the address included in the control message includes a Media Access Control (MAC) address of receivers that will switch operation modes into waiting modes if the traffic is generated.

4. The method as claimed in claim 1, wherein the address included in the control message is a Media Access Control (MAC) address of receivers that will update a Network Allocation Vector (NAV) if the traffic is generated.

5. The method as claimed in claim 2, wherein the MAC address includes one of a globally administered individual address, a locally administered individual address, a globally administered group address and a locally administered group address.

6. The method as claimed in claim 3, wherein the MAC address includes one of a globally administered individual address, a locally administered individual address, a globally administered group address and a locally administered group address.

7. The method as claimed in claim 4, wherein the MAC address includes one of a globally administered individual address, a locally administered individual address, a globally administered group address and a locally administered group address.

8. A system for transmitting/receiving signals in a Wireless Local Area Network (WLAN) mesh communication system, the system comprising:
    a transmitter for transmitting a control message including an address to receivers according to a generated traffic, if traffic is generated; and
    a receiver for receiving the control message, confirming the address included in the control message, and performing a predetermined operation according to results obtained by confirming the address.

9. The system as claimed in claim 8, wherein the address included in the control message includes a Media Access Control (MAC) address of receivers that will process the generated traffic.

10. The system as claimed in claim 8, wherein the address included in the control message includes a Media Access Control (MAC) address of receivers that will switch operation modes into waiting modes if the traffic is generated.

11. The system as claimed in claim 8, wherein the address included in the control message is a Media Access Control (MAC) address of receivers that will update a Network Allocation Vector (NAV) if the traffic is generated.

12. The system as claimed in claim 9, wherein the MAC address includes one of a globally administered individual address, a locally administered individual address, a globally administered group address and a locally administered group address.

13. The system as claimed in claim 10, wherein the MAC address includes one of a globally administered individual address, a locally administered individual address, a globally administered group address and a locally administered group address.

14. The system as claimed in claim 11, wherein the MAC address includes one of a globally administered individual address, a locally administered individual address, a globally administered group address and a locally administered group address.

15. A method for transmitting/receiving a control message of one or more receivers in a Wireless Local Area Network (WLAN) mesh communication system including the receivers, the method comprising the steps of:
    setting, by a transmitter, a Media Access Control (MAC) address of a receiver, which has a priority from among the receivers, in a MAC address field of a frame of the control message;
    setting, by a transmitter, time maintaining the priority in a duration field of the frame;
    transmitting, by a transmitter, the frame to a receiver, the frame employing the MAC address as a destination;
    receiving, by the receiver, the transmitted frame, confirming a priority corresponding to the MAC address; and
    performing, by the receiver, a predetermined operation according to the confirmed priority.

16. The method as claimed in claim 15, wherein the frame is a Clear-to-Send (CTS) frame.

17. The method as claimed in claim 15, wherein the MAC address includes one of a globally administered individual address, a locally administered individual address, a globally administered group address and a locally administered group address.

18. The method as claimed in claim 15, wherein, in the step of performing the predetermined operation, the receiver does not perform Network Allocation Vector (NAV) update if the MAC address of the received frame is a MAC address according to a generation of a Wireless Distribution System (WDS) traffic.

19. The method as claimed in claim 15, wherein, in the step of performing the predetermined operation, the receiver performs Network Allocation Vector (NAV) update during the time set in the duration field if the MAC address of the received frame is an address according to a generation of a Wireless Distribution System (WDS) traffic.

20. The method as claimed in claim 18, wherein the NAV update is performed so as that a NAV represents that data transmission to the transmitter is impossible.

21. The method as claimed in claim 19, wherein the NAV update is performed so as that a NAV represents that data transmission to the transmitter is impossible.

22. A system for transmitting/receiving a control message of one or more receivers in a Wireless Local Area Network (WLAN) mesh communication system including the receivers, the system comprising:
- a transmitter for setting a Media Access Control (MAC) address of a receiver, which has a priority from among the receivers, in a MAC address field of a frame of the control message, setting time maintaining the priority in a duration field of the frame, and transmitting the frame to a receiver, the frame employing the MAC address as a destination; and
- a receiver for receiving the frame, confirming a priority corresponding to the MAC address, and performing a predetermined operation according to the confirmed priority.

23. The system as claimed in claim 22, wherein the frame is a Clear-to-Send (CTS) frame.

24. The system as claimed in claim 22, wherein the MAC address includes one of a globally administered individual address, a locally administered individual address, a globally administered group address and a locally administered group address.

25. The system as claimed in claim 22, wherein the receiver does not perform Network Allocation Vector (NAV) update if the MAC address of the received frame is an address according to a generation of a Wireless Distribution System (WDS) traffic.

26. The system as claimed in claim 22, wherein the receiver performs Network Allocation Vector (NAV) update during the time set in the duration field if the MAC address of the received frame is an address according to a generation of a Wireless Distribution System (WDS) traffic.

27. The system as claimed in claim 25, wherein the NAV update is performed so as that a NAV represents that data transmission to the transmitter is impossible.

28. The system as claimed in claim 26, wherein the NAV update is performed so as that a NAV represents that data transmission to the transmitter is impossible.

29. The method as claimed in claim 1, wherein, in the step of performing the predetermined operation, the receiver performs Network Allocation Vector (NAV) update during a predetermined time if the address included in the control message is a Media Access Control (MAC) address according to a generation of a Wireless Distribution System (WDS) traffic.

30. The method as claimed in claim 29, wherein the NAV update is performed so as that a NAV represents that data transmission to the transmitter is impossible.

31. The system as claimed in claim 8, wherein the receiver performs Network Allocation Vector (NAV) update during a predetermined time if the address included in the control message is a Media Access Control (MAC) address according to a generation of a Wireless Distribution System (WDS) traffic.

32. The system as claimed in claim 31, wherein the NAV update is performed so as that a NAV represents that data transmission to the transmitter is impossible.

* * * * *